(12) United States Patent
Fritzer

(10) Patent No.: US 8,147,380 B2
(45) Date of Patent: Apr. 3, 2012

(54) HYDRAULIC CONTROL APPARATUS OF AN AUTOMATED MULTI-STEP CHANGE-SPEED GEARBOX

(75) Inventor: Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 432 days.

(21) Appl. No.: 12/445,648

(22) PCT Filed: Oct. 11, 2007

(86) PCT No.: PCT/EP2007/060816
§ 371 (c)(1),
(2), (4) Date: Apr. 15, 2009

(87) PCT Pub. No.: WO2008/049735
PCT Pub. Date: May 2, 2008

(65) Prior Publication Data
US 2010/0120583 A1    May 13, 2010

(30) Foreign Application Priority Data
Oct. 24, 2006  (DE) .......................... 10 2006 049 972

(51) Int. Cl.
*F16H 61/26* (2006.01)
(52) U.S. Cl. ........................................ 477/158
(58) Field of Classification Search .................. 477/156, 477/158, 127, 129, 130, 131; 74/730.1, 731.1, 74/732.1
See application file for complete search history.

(56) References Cited

U.S. PATENT DOCUMENTS

| 6,887,183 B2* | 5/2005 | Murasugi ........................ 477/143 |
| 6,905,433 B2* | 6/2005 | Schmidt et al. ................ 475/121 |
| 7,513,850 B2* | 4/2009 | Yoneyama ........................ 477/80 |
| 2007/0105681 A1 | 5/2007 | Bucher et al. |
| 2008/0171633 A1* | 7/2008 | Gansohr et al. ................ 477/175 |

FOREIGN PATENT DOCUMENTS

| DE | 101 34 115 A1 | 1/2003 |
| DE | 103 47 203 A1 | 6/2004 |
| EP | 0 926 352 A2 | 6/1999 |
| EP | 1 522 754 A1 | 4/2005 |
| WO | 2004/102042 A1 | 11/2004 |

* cited by examiner

*Primary Examiner* — David D Le
*Assistant Examiner* — David J Hlavka
(74) *Attorney, Agent, or Firm* — Davis & Bujold, P.L.L.C.

(57) ABSTRACT

A hydraulic control device with a plurality of gear-actuating cylinders for engaging and disengaging the gears of an automated multi-step transmission, with pressure-controlled gear-regulating valves for controlling the pressure in one pressure chamber of the cylinders, and with a multiplex arrangement of singly switchable pressure-controlled selector valves for assigning the regulating valves to one pressure chamber of the actuating cylinders. The device includes a common pilot valve, designed as a regulating valve, for actuating one of the regulating valves and at least one of the selector valves. The pilot valve features a first control pressure range that contains the switching pressure of the selector valve and a second control pressure range that contains the regulating range of the gear-regulating valve.

9 Claims, 5 Drawing Sheets

| | | | | | | | | |
|---|---|---|---|---|---|---|---|---|
| WV1 | ○ | ● | ○ | ● | ○ | ● | ○ | ● |
| WV2 | ○ | ○ | ● | ● | ○ | ○ | ● | ● |
| WV3 | ○ | ○ | ○ | ○ | ● | ● | ● | ● |
| D1 | | | | | ● | | ● | |
| D2 | | | ● | | | | ● | |
| D3 | | | | | | | | ● |
| D4 | | | | | | | | ● |
| D5 | | | | | | ● | | |
| D6 | | | | | | ● | | ● |
| D7 | | | | ● | | | | |
| D8 | | ● | | ● | | | | |

Fig. 5

HYDRAULIC CONTROL APPARATUS OF AN AUTOMATED MULTI-STEP CHANGE-SPEED GEARBOX

This application is a National Stage completion of PCT/EP2007/060816 filed Oct. 11, 2007, which claims priority from German patent application serial no. 10 2006 049 972.7 filed Oct. 24, 2006.

FIELD OF THE INVENTION

The invention relates to a hydraulic control device of an automated multi-step transmission with a plurality of gear-actuating cylinders for engaging and disengaging the gears of a multi-step transmission, with at least two pressure-controlled gear-regulating valves for controlling the operating pressure in what is in each case one pressure chamber of the gear-actuating cylinders, and with a multiplex arrangement of a plurality of singly switchable pressure-controlled selector valves for assigning the gear-regulating valves to, in each case, one pressure chamber of the gear-actuating cylinders.

BACKGROUND OF THE INVENTION

Automated multi-step transmissions, designed as an automated manual transmission with a single input shaft and an assigned decoupler, designed as an automated dual-clutch with two input shafts assigned respectively to one of two partial transmissions, as well as with one decoupler respectively per input shaft, have been known in different designs for some time and have in part been used for several years in series-production vehicles.

The control device of an automated manual transmission comprises actuators, such as gear actuators for engaging and disengaging the gears, as well as a clutch actuator for engaging and disengaging the decoupler arranged in the power flow between the internal combustion engine and the input shaft of the transmission, as well as the control elements for controlling these actuators. In a similar manner, a control device of an automated dual-clutch transmission for each of the two partial transmissions comprises, in each case, actuators, such as gear actuators for engaging and disengaging the assigned gears and a clutch actuator for disengaging and engaging the assigned decoupler, as well as control elements for controlling the relevant actuators.

Due to high energy density, good control qualities, and the availability of technically perfected components, the control devices of automated manual transmissions and automated dual-clutch transmissions are usually constructed as hydraulic devices, in which the relevant gear actuators and clutch actuators are constructed as hydraulic actuating cylinders, and the assigned control elements as hydraulic selector or regulator valves. The gear-actuating cylinders can also be constructed as singly operating actuating cylinders, each having a single pressure chamber, which for engaging and disengaging a maximum of two gears assigned to one actuating rod, also requires two gear-actuating cylinders per actuating rod. The gear-actuating cylinders can, however, also be constructed as double-acting actuating cylinders with two pressure chambers each, in which case, for engaging and disengaging a maximum of two gears assigned to one actuating rod, only one gear-actuating cylinder per actuating rod is required.

The actuating and regulating valves can also be executed as directly controllable magnetic valves, and with this design, as directly actuated in each case by an electric control current. However, as this requires correspondingly strong electromagnets of relatively large dimensions and considerable weight, as well as comparatively high electric control currents, the actuating and regulating valves are preferably designed as pressure-controlled, and can, with this type of construction, be actuated by pilot valves that are usually designed as smaller magnetic valves. Particularly in the case of heavy commercial vehicles that are equipped with a pneumatic pressure-supply device for supplying energy to the pressure-accumulator brake system prescribed for this type of vehicle, a pneumatic construction of control devices for corresponding multi-step transmissions, with largely identical construction and the same functionality, is also possible as an alternative. That is why the present invention also includes pneumatic control devices, even though below, for the purpose of consistent formulation, only hydraulic control devices will be named.

A typical hydraulic control device of a dual-clutch transmission is described in DE 101 34 115 A1. In this known control device, a largely independent control branch is provided for each of the two partial transmissions. Each control branch features two gear-regulating valves respectively for controlling the operating pressure in each pressure chamber respectively by two assigned gear-actuating cylinders, each of which is double-acting, and one clutch control value for controlling the operating pressure in the assigned decoupler. The gear and clutch control valves are constructed as magnetic regulating valves, which are associated with the previously cited disadvantages of a large installation space requirement and high control current requirement.

In order to assign the gear control valves to the pressure chambers of the appropriate gear-actuating cylinders, a multiplex valve is provided, which is constructed as a singly switchable magnetic control valve with two shift positions. Using the multiplex valve, the operating pressure lines of the two gear-regulating valves are each alternately connected to the two pressure chambers of a single gear-actuating cylinder of the partial transmission concerned. With a mechanical or hydraulic coupling of the valve sections of both partial transmissions, there is, with a switchover of the multiplex valve, perforce a change in the assignment of the gear-regulating valves, in each case in both control branches at the same time. Due to its complicated construction, the multiplex valve is correspondingly large, expensive, and prone to malfunction. Furthermore, switches between two gears, which require a switchover of the multiplex valve, involve a correspondingly long temporal delay.

Another hydraulic control device of a dual-clutch transmission is known in a plurality of embodiments from DE 103 47 203 A1. In a first embodiment of this control device according to FIG. 40, a single gear-regulating valve with two controllable operating pressure lines is provided for controlling the operating pressure of two pressure chambers of a plurality of gear actuation cylinders. The gear-regulating valve is constructed here as a 4/3-way magnetic regulating valve. For the assignment of the gear-regulating valve to the gear-actuating cylinders of both partial transmissions, which are designed as double-acting actuating cylinders, a multiplex arrangement of a partial-transmission selector valve downstream of the gear-regulating valve and two cylinder selector valves downstream of that are provided. The selector valves are constructed respectively as singly switchable 8/2-way pressure-switch valves, whereby the cylinder selector valves are assigned respectively to the two gear-actuating cylinders of a partial transmission.

The shift position of the partial transmission selector valve determines the assignment of the gear-regulating valve to one of the two partial transmissions, and the shift position of the respective cylinder selector valve determines the assignment of the gear-regulating valve to one of the two gear-actuating cylinders of the partial transmission concerned. For actuation of the partial transmission selector valve, a pilot valve designed as a 3/2-way magnetic control valve is placed upstream of the selector valve. For actuation of the two cylinder selector valves, a common pilot valve designed as a 3/2-way magnetic control valve is provided.

Using the multiplex arrangement of simple and spacing-saving pressure-controlled selector valves results in advantages in terms of cost and installation space. The use of a single gear-regulating valve also has advantages compared with the aforesaid control device related to cost and installation space, but because of the coupled control of the operating pressure of both pressure chambers, it involves functional restrictions, and because of the electromagnetic control, there are certain disadvantages in terms of cost and installation space.

With a pressure-controlled variant of the embodiment of the gear-regulating valve according to FIG. 42 of DE 103 47 203 A1, at least referred to cost and installation-space disadvantages are eliminated. There, the pressure-controlled gear-regulating valve is actuated using an assigned pilot valve that is constructed as a magnetic regulating valve. Using two pressure-controlled gear-regulating valves according to FIG. 43 there enables independent control of the operating pressure of both pressure chambers, which improves the control characteristics of this known control device. There, the two pressure-controlled gear-regulating valves can be actuated in each case by means of an assigned pilot valve constructed in each case as a magnetic regulating valve.

Despite the cost and installation-space advantages and the functional advantages of the latter embodiment of the known control device, there is still a general need to make additional savings in cost and installation space as well as to improve the functional characteristics of a control device of this type.

SUMMARY OF THE INVENTION

Against this background, the present invention is based on the task of proposing a hydraulic control device of an automated multi-step manual transmission of the type cited initially, which, with the same functional scope, would have simpler and more cost-efficient construction and even possibilities to expand functionality.

This task is accomplished by means of a hydraulic control device of an automated multi-step transmission with a plurality of gear-actuating cylinders for engaging and disengaging the gears of the multi-step transmission, with at least two pressure-controlled gear-regulating valves for controlling the operating pressure in respectively one pressure chamber of the gear-actuating cylinder, and with a multiplex arrangement of a plurality of singly switchable pressure-controlled selector valves for assigning the gear-regulating valves to in each case one pressure chamber of the gear-actuating cylinders. Furthermore, it is provided that at least one common pilot valve, constructed as a regulating valve, for actuation one of the gear-regulating valves, and at least one selector valve is provided, wherein the pilot valve features a first control pressure range containing the selection pressure of the at least one selector valve and a second control pressure range that contains the regulating range of the gear-regulating valve.

Advantageous embodiments and further developments of the inventive hydraulic control device are the subject of the dependent claims.

By using a common pilot valve for actuating a gear-regulating valve and at least one selector valve, a pilot valve that is usually constructed as a magnetic control valve and is normally used to actuate a selector valve is advantageously dispensed with. With a hydraulic control device of a dual-clutch transmission, such as that known, for example, from DE 103 47 203 A1, at least two pilot valves constructed as magnetic control valves can be dispensed with in this way. In so doing, impairment of the functional scope of the control device can be avoided by extensively separating the shifting function and the regulating function of the common pilot valve.

For this purpose, it is preferably provided that the first control pressure range of the pilot valve is below the second pressure control range, that the shifting pressure of the at least one selector valve lies approximately in the middle of the first control pressure range, and that the regulating range of the gear-regulating valve is largely identical to the second pressure control range. That results in three operating ranges for the common pilot valve: a first operating range in which the assigned selector valve is not shifted and the assigned gear-regulating valve has not yet reached its regulating range; a second operating range in which the assigned selector valve is shifted and the assigned gear-regulating valve has not yet reached its regulating range; and a third operating range in which the assigned selector valve is shifted and the assigned gear-regulating valve is inside its regulating range. This results in numerous possibilities for use, which will be described in detail below.

In order to adjust the beginning of the regulating range of the gear-regulating valve to a higher control pressure of the pilot valve or, as the case may be, to set it there permanently, the gear-regulating valve features for this purpose a correspondingly pretensioned valve spring. With this, however, when there is reduction pressure, the resolution of the pilot valve deteriorates across the regulating range of the gear-regulating valve. But the regulating range of the gear-regulating valve is completely retained.

The pilot valve is preferably constructed as a magnetic regulating valve, for example as a 3/2-way magnetic regulating valve, or as a 3/3-way magnetic regulating valve with a connection to a control pressure supply line that carries an input-side control pressure, a control terminal of a control pressure line that leads to an assigned gear-regulating valve, and switching pressure line that leads to an assigned selector valve, as well as a connection to a non-pressurized line.

In order to avoid reciprocal dysfunction or blocking of the switching function and the regulating function of the common pilot valve, the gear-regulating valve and the at least one selector valve are assigned to different actuating rods or different partial transmissions.

In a first preferred embodiment of the inventive control device that can be used in an automated manual transmission or a partial transmission of an automated dual-clutch transmission with two actuating rods, that is, with two dual-acting gear-actuating cylinders, each with two pressure chambers, or with four singly acting gear-actuating cylinders, each with one pressure chamber, a switching arrangement with two gear-regulating valves, two selector valves, and two pilot valves is provided, in which in each case two pressure chambers can be connected alternately, via respectively one of the selector valves, with the operating pressure line of an assigned gear-regulating valve, or with a non-pressurized line. In this way, the control pressure chamber of the respective gear-regulating valve, via a control pressure line, and the switching pressure chamber of the selector valve assigned to the other respective gear-regulating valve, via a switching pressure line, are connected respectively with the control terminal of a common pilot valve. In that way, largely independent switching of the two selector valves and regulation of the two gear-regulating valves is possible.

If, in the concerned multi-step transmissions, rapid switching between two specific gears assigned to a common actuating rod is required, the two pressure chambers that are connected to the gear-regulating valves when the selector valves are not switched, and the two pressure chambers that are connected to the gear-regulating valves when the selector valves have been switched, are assigned respectively to a common actuating rod.

This makes it possible to use the actuating rod concerned, to which the pressure chambers are assigned that are connected to the gear-regulating valves when the selector valves are switched, to regulate, by means of the one gear-regulating valve, the operating pressure for disengaging the engaged loaded gear and synchronizing and engaging the target gear that is to be engaged, and at the same time, by means of the other gear-regulating valve, to regulate the operating pressure for braking the actuating rod in order to avoid excessively high mechanical strain on the components involved.

If, on the other hand, rapid shifting between two specific gears that are assigned to different actuating rods is required, the two pressure chambers that are connected to the gear-regulating valves when the selector valves are not switched, and the pressure chambers that are connected to the gear-regulating valves when the selector valves are switched, are each assigned to different actuating rods.

In this way, it is possible to almost simultaneously disengage, via the one gear-regulating valve, the engaged loaded gear by means of regulating the operating pressure in the one pressure chamber concerned, and to quickly engage the target gear that is supposed to be engaged, in a partially temporally overlapping manner, by regulating the operating pressure in the other pressure chamber concerned by means of the other gear-regulating valve.

In a second preferred embodiment of the inventive control device, which can be used in an automated dual-clutch transmission with four actuating rods, that is, with four dually active gear-actuating cylinders, each of which has two pressure chambers, or with eight singly active gear-actuating cylinders, each with one pressure chamber, a shifting arrangement with three gear-regulating valves, three selector valves, and three pilot valves is provided, by means of which, via a first selector valve, the two operating pressure lines of a first gear-regulating valve and a second gear-regulating valve can be respectively alternately connected to an assigned pressure chamber or to a respective connecting line that leads to another selector valve, where, via a second selector valve, the connection line that comes from the first selector valve can be connected alternately with two different pressure chambers, and where, via a third selector valve, the operating pressure of a third gear selector valve and the connecting line coming from the first selector valve can be respectively alternately connected to two different pressure chambers. The control pressure chamber of the first gear-regulating valve and the control pressure chamber of the third selector valve are also connected to the control terminal of a common first pilot valve, a control pressure chamber of the second gear-regulating valve and a control pressure chamber of the second selector valve are connected to a common second pilot valve, and the control pressure chamber of the third gear-regulating valve and the control pressure chamber of the first selector valve are connected to the control terminal of a common third pilot valve.

This results in three shift positions of the selector valves in which two pressure chambers respectively can be regulated by two gear-regulating valves simultaneously, independently of each other, and one shift position of the selector valves in which three pressure chambers can be regulated simultaneously by all three gear-regulating valves, independently of each other.

In order to optimally exploit the advantage of this embodiment of the inventive control device, it is usefully provided that the two pressure chambers, whose operating pressure can be simultaneously regulated in the appropriate shift positions of the selector valves, are each assigned to a common actuating rod. Additionally, it can be provided that the three pressure chambers, whose operating pressure can be regulated in a corresponding shift position of the selector valves, are assigned to the gears between which there is often rapid shifting during driving operation, particularly the first gear G1, the second gear G2, and the reverse gear R.

BRIEF DESCRIPTION OF THE DRAWINGS

In order to clarify the invention, drawings with examples of execution are added to the description.

It shows the following.

DETAILED DESCRIPTION OF THE PREFERRED EMBODIMENTS

Figure 6:
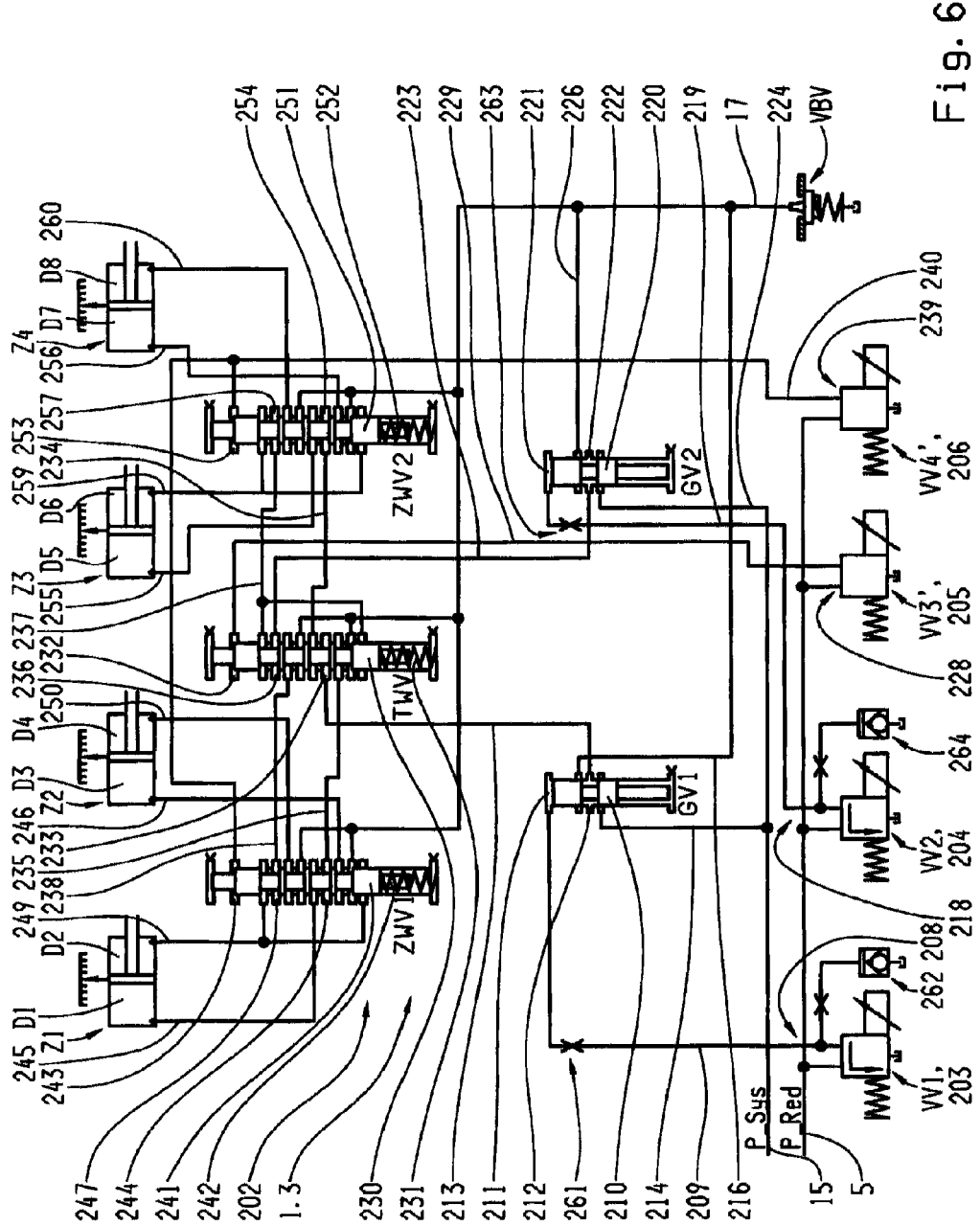

A known hydraulic control device 1.3 of a dual-clutch transmission that corresponds to the drive-side part of a control device of an embodiment described in DE 103 47 203 A1 according to the FIG. 43, shows, according to FIG. 6, four dually operating gear-actuating cylinders Z1-Z4, with in each case two pressure chambers D1-D8 for engaging and disengaging associated gears G1-G7 and R, two pressure-controlled gear-regulating valves GV1, GV2 for regulating the operating pressure in two of the pressure chambers D1-D8, a multiplex arrangement 202 with a pressure-controlled partial transmission selector valve TWV, and two pressure-controlled cylinder selector valves ZWV1, ZWV2 for selective assignment of the two gear-regulating valves GV1, GV2 to two of the eight pressure chambers D1-D8, as well as two pilot valves VV1, VV2, each configured as a magnetic regulating valve 203, 204 for actuating the two gear-regulating valves GV1, GV2, and two pilot valves VV3', VV4', each configured as a magnetic control valve 205, 206, for actuating the selector valves TWV, ZWV1, ZWV2.

The first pilot valve VV1, which can, for example, be constructed as a 3/2-way magnetic regulating valve, or as a 3/3-way magnetic regulating valve, features a connection of a control pressure supply line 5 that carries a reduction pressure P_Red, a control terminal 208 of a control pressure line 209 leading to a first gear-regulating valve GV1, and a connection of a non-pressurized line that is not presented in more detail.

The first gear-regulating valve GV1 is constructed as a slide valve with a valve piston 210. The control pressure line 209 of the assigned first pilot valve VV1 is connected to a front-side control pressure chamber 211 of the first gear-regulating valve GV1. A central pressure chamber 212 of the first gear-regulating valve GV1 is connected by means of an operating pressure line 213 to the partial transmission selector valve TWV. By means of the control collar of the valve piston 210 adjacent to the control edges, the central pressure chamber 212, and in that way the operating pressure line 213, can be connected in a controllable manner to a pressure line 214, which branches off from a supply pressure line 15 that carries a system pressure P_Sys, and to a non-pressurized line 216 that leads to a collector line 17. In that way, a pilot pressure that is adjusted by the pilot valve VV1 in the control pressure line 209 is proportionally transformed by means of the gear-regulating valve GV1 into an operating pressure that is operant in the operating pressure line 213.

The second pilot valve VV2, which is preferably constructed in the same way as the first pilot valve VV1, has a connection to the control-pressure supply line 5 that carries the reduction pressure P_Red, a control terminal 218 of the control-pressure line 219 leading to the second gear-regulating valve GV2, and a connection to a non-pressurized line that is not shown in more detail.

The second gear-regulating valve GV2 is constructed in the same way as the first gear-regulating valve GV1, as a slide valve with a valve piston 220. The control pressure line 219 or the assigned second pilot valve VV2 is connected to a front-side control-pressure chamber 221 of the second gear-regulating valve GV2. A central pressure chamber 222 of the second gear-regulating valve GV2 is in connection with the partial transmission selector valve TWV by means of an operating pressure line 223. By means of the control collar of the valve piston 220 adjacent to the control edges, the central pressure chamber 222, and in that way the operating pressure line 223, can be connected in a controllable manner to a pressure line 224, which branches off from a supply pressure line 15, and with a non-pressurized line 226 that leads to a collector line 17. In that way, a pilot pressure that is adjusted by the pilot valve VV2 in the control pressure line 219 is proportionally transformed by means of the gear-regulating valve GV2 into an operating pressure that is operant in the operating pressure line 223.

The third pilot valve VV3' has a connection to the control-pressure supply line 5 that carries the reduction pressure P_Red, a control terminal 228 of the control-pressure line 229 leading to the partial transmission selector valve TWV, and a connection to a non-pressurized line that is not shown in more detail.

The partial transmission selector valve TWV is constructed as a slide switch valve with a valve piston 230 and a valve spring 231. The switching-pressure line 229 of the assigned third pilot valve VV3' is connected to a front-side switching-pressure chamber 232 of the partial transmission selector valve TWV that faces away from the valve spring 231. The operating pressure line 213 of the first gear-regulating valve GV1 is connected to a first central pressure chamber 223 of the partial transmission selector valve TWV. By means of the control collar of the valve piston 230 adjacent to the control edges, this pressure chamber 233, and in that way the operating pressure line 213, can be connected alternately to a first connecting line 234 that leads to the second cylinder selector valve ZWV2, or to a first connecting line 235 that leads to the first cylinder selector valve ZWV1.

The operating pressure line 223 of the second gear-regulating valve GV2 is connected to a second, central pressure chamber 236 of the partial transmission selector valve TMV. By means of the control collar of the valve piston 230 adjacent to the control edges, this pressure chamber 236, and in that way the operating pressure line 223, can be alternately connected to a second connecting line 237 that leads to the second cylinder selector valve ZWV2, or to a second connecting line 238 that leads to the first cylinder selector valve ZWV1.

In that way, the operating pressures that are operant in the operating pressure lines 213, 223 of the two gear-regulating valves GV, GV2 are transferred via the partial transmission selector valve TWV alternately to the first cylinder selector valve ZWV1 or the second cylinder selector valve ZWV2, in this case, with non-switched partial transmission selector valve TWV to the second cylinder selector valve ZWV2, and with switched partial transmission selector valve TWV, to the first cylinder selector valve ZWV1.

The fourth pilot valve VV4' has a connection to the control-pressure supply line 5 that carries the reduction pressure P_Red, a control terminal 239 of the control-pressure line 240 leading to the two cylinder selector valves ZW1, ZWV2, and a connection to a non-pressurized line that is not shown in more detail.

The first cylinder selector valve ZWV1 is configured as a slide switch valve with a valve piston 241 and a valve spring 242. The switching pressure line 240 of the assigned fourth pilot valve VV4' is connected to a front-side switching-pressure chamber 243 of the first cylinder selector valve ZWV1 that faces away from the valve spring 242. The first connecting line 235 coming from the partial transmission selector valve TWV is connected to a first central pressure chamber 244 of this cylinder selector valve ZWV1.

By means of the control collar of the valve piston 241 adjacent to the control edges, this pressure chamber 244, and in that way the first connecting line 235, can be connected alternately to a connecting line 245 that leads to the first pressure chamber D1 of the first gear-actuating cylinder Z1, or to a connecting line 246 that leads to the first pressure chamber D3 of the second gear-actuating cylinder Z2.

The second connecting line 238 coming from the partial transmission selector valve TWV is connected to a second, central pressure chamber 247 of the first cylinder selector valve ZWV1. By means of the control collar of the valve piston 241 adjacent to the control edges, this pressure chamber 247, and in that way the second connecting line 238, can be alternately connected to a connecting line 249 that leads to the second pressure chamber D2 of the first gear-actuating cylinder Z1, or to a connecting line 250 that leads to the second pressure chamber D4 of the second gear-actuating cylinder Z2.

In that way, the two connecting lines 235 or, as the case may be, 238 that come from the partial transmission selector valve TWV, said connecting lines, in the switched shifting position of the partial transmission selector valve TWV, carrying the operating pressures operant in the operation pressure lines 213, 223 of the two gear-regulating valves GV1, GV2, are connected through via the cylinder selector valve ZWV1 alternately to the two pressure chambers D1 or, as the case may be, D2 of the first gear-actuating cylinder Z1, or to the two pressure chambers D3 or, as the case may be, D4 of the second gear-actuating cylinder Z2. In this case, this takes place with non-switched cylinder selector valve ZWV1 to the pressure chambers D1 or, as the case may be, D2 of the first gear-actuating cylinder Z1, and with switched cylinder selector valve ZWV1 to the pressure chambers D3 or, as the case may be, D4 of the second gear-actuating cylinder Z2.

The second cylinder selector valve ZWV2 is constructed in a similar way to the first cylinder selector valve ZWV1 and also features a valve piston 251 and a valve spring 252. The switching pressure line 240 of the assigned fourth pilot valve VV4' is connected to a front-side switching pressure chamber 253 of the second cylinder selector valve ZWV2 that faces away from the valve spring 252. The first connection line 234 coming from the partial transmission selector valve TWV is connected to a first central pressure chamber 254 of this cylinder selector valve ZWV2. By means of the control collar of the valve piston 251 adjacent to the control edges, this pressure chamber 254, and in that way the first connection line 234, can be connected alternately to a connecting line 255 that leads to the first pressure chamber D5 of the third gear-actuating cylinder Z3, or to a connecting line 256 that leads to the first pressure chamber D7 of the fourth gear-actuating cylinder Z4.

The second connecting line 237 coming from the partial transmission selector valve TWV is connected to a second, central pressure chamber 257 of the second cylinder selector valve ZWV2. By means of the control collar of the valve piston 251 adjacent to the control edges, this pressure chamber 257, and in that way the second connection line 237, can be connected alternately to a connection line 259 leading to the second pressure chamber D6 of the third gear-actuating cylinder Z3, or to a connecting line 260 leading to the second pressure chamber D8 of the fourth gear-actuating cylinder Z4.

In this way, the two connecting lines 234 or, as the case may be, 237 that come from the partial transmission selector valve TWV, which, in the non-switched shifting position of the partial transmission selector valve TWV carry the operating pressures operant in the operating pressure lines 213 or, as the case may be, 223 of the two gear-regulating valves GV1 or, as the case may be, GV2 can be connected through, via the cylinder selector valve ZWV2, alternately to the two pressure chambers D5, D6 of the third gear-actuating cylinder Z3, or to the two pressure chambers D7, D8 of the fourth gear-actuating cylinder Z4, in the present instance, with non-switched cylinder selector valve ZWV2 to pressure chambers D5, D6 of the third gear-actuating cylinder Z3, and with switched cylinder selector valve ZWV2 to the pressure chambers D7, D8 of the fourth gear-actuating cylinder Z4.

The connecting lines 234, 235, 237, 238, which are blocked respectively in the two shift positions of the partial transmission selector valve TWV, as well as the connecting lines 245, 246, 249, 250 or, as the case may be, 255, 256, 259, 260, which are blocked respectively in the two shift positions of the two cylinder selector valves ZWV1 and ZWV2, are then each switched without pressure by means of a connection with the collector line 17. This collector line 17 is connected to an oil sump, which is not shown in more detail, by means of a pre-filling valve VBV, by means of which drainage of the pressure chambers D1-D8 and the lines concerned is prevented.

In order to compensate for and dampen pressure fluctuations, the control pressure lines 209, 219 of the two gear-regulating valves GV1, GV2 are each provided with an inbuilt throttle 261, 263 and in each case with an attached pressure reservoir 262, 264.

With this known control device 1.3, component complexity, particularly the comparatively expensive magnetic valves 203-206, is relatively great, and the control possibilities are comparatively small.

It is therefore inventively proposed that the regulating function for controlling a gear-regulating valve GV1, GV2 and the switching function for controlling at least one selector valve TWV, ZWV1, ZWV2, be combined in a common pilot valve VV1, VV2, constructed as a regulating valve. This pilot valve VV1, VV2 has a first control pressure range $\Delta P\_B1$, that contains the switching pressure $P\_S$ of the at least one selector valve TWV, ZWV1, ZWV2, and a second control pressure range $\Delta P\_B2$, that contains the regulating range $\Delta P\_R$ of the assigned gear-regulating valve GV1, GV2.

In order to achieve extensive separation of the two control functions of the common pilot valve VV1, VV2 in terms of control technology, the first control pressure range $\Delta P\_B1$ lies below the second control pressure range $\Delta P\_B2$, and the switching pressure $P\_S$ of the at least one selector valve TWV, ZWV1, ZWV2 lies approximately in the middle of the first control pressure range $\Delta P\_B1$. The regulating range $\Delta P\_R$ of the gear-regulating valve GV1, GV2, in order to achieve the greatest possible resolution, is advantageously largely identical to the second control pressure range $\Delta P\_B2$.

Figures 2, 3:
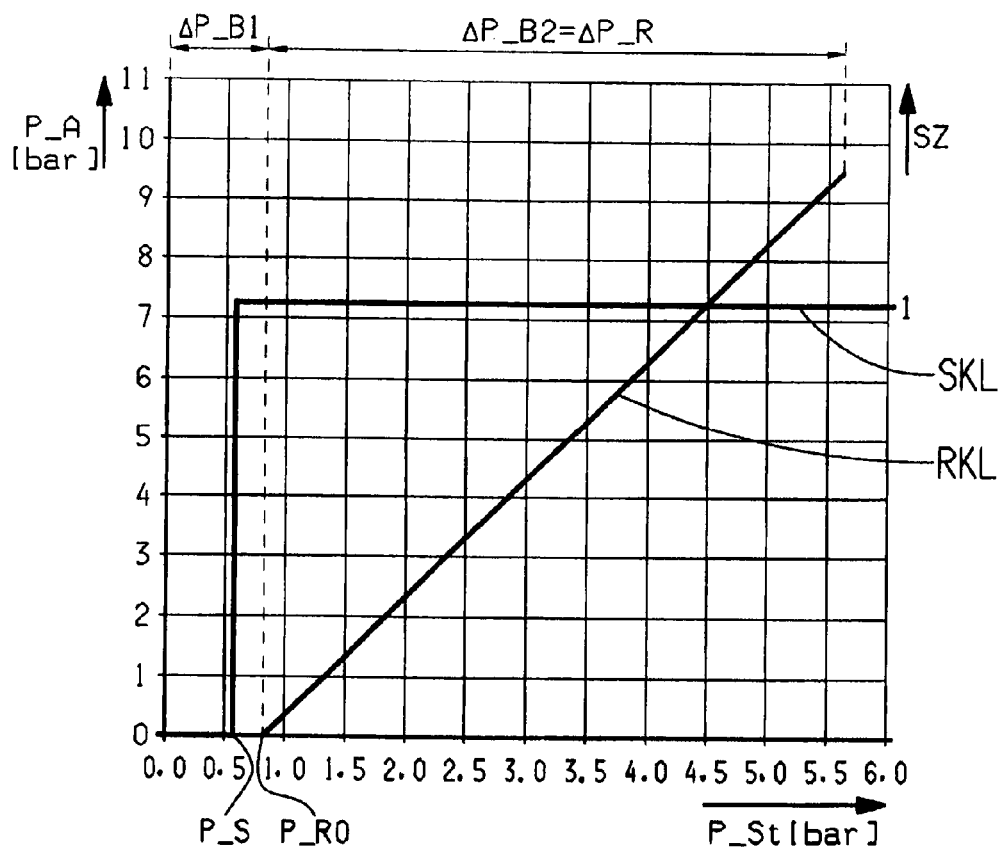

This correlation is illustrated in the diagram in FIG. 3, in which the operating pressure $P\_A$, that can be adjusted by means of the assigned gear-regulating valve GV1, GV2, is shown above the control pressure $P\_St$ that can be adjusted using the pilot valve. The start $P\_RO$ of the regulating range $\Delta P\_R$ is adjusted from a value $P\_St=0$ to a higher value, by means of which an assigned control characteristic RKL, with the existing reduction pressure $P\_Red$, is shorter and steeper than it would be without the switching function, leading to the resolution of the regulating function being correspondingly smaller.

The switching function, as illustrated in FIG. 3, using a shifting characteristic SKL, is executed with overshooting or, as the case may be, undershooting of the switching pressure $P\_S$, that is, below the switching pressure $P\_S$, the assigned selector valve TWV, ZWV1, ZWV2 is in non-switched switching status $SZ=0$, and above the switching pressure $P\_S$ in switched switching status $SZ=1$, which can be seen from the right side of the diagram.

Figure 1:
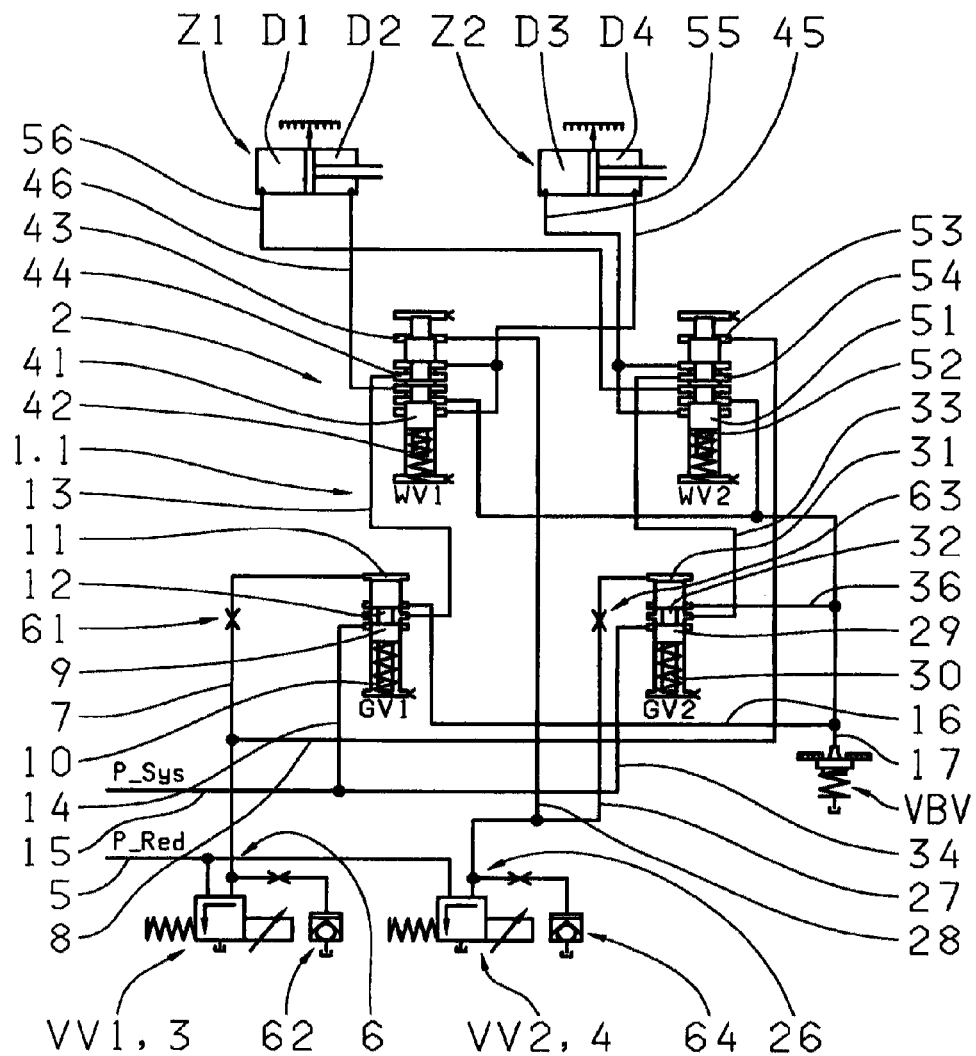
FIG. 1 an inventive embodiment of a hydraulic control device for an automated multi-step transmission or a partial transmission of an automated multi-step transmission with two actuating rods in the form of a schematic diagram, FIG. 2 a block diagram of the control device according to FIG. 1 in the form of a table, FIG. 3 a diagram to illustrate the mode of action of a pilot valve of the control device according to FIG. 1, FIG. 4 an inventive execution variant of a hydraulic control device of an automated multi-step manual transmission with four actuating rods in the form of a schematic diagram, FIG. 5 a block diagram of the control device according to FIG. 4 in the form of a table, and FIG. 6 a known hydraulic control device of an automated dual-clutch transmission with four actuating rods in the form of a schematic diagram.

A first example of use of the two pilot valves of this type with a combined regulating and switching function is illustrated in an inventive hydraulic control device 1.1 according to FIG. 1, which can be used in an automated manual transmission or in a partial transmission of an automated dual-clutch transmission. This control device 1.1 comprises two dual-acting gear-actuating cylinders Z1, Z2, each with two pressure chambers D1-D4, two pressure-controlled gear-regulating valves GV1, GV2 for regulating the operating pressure in respectively two of the pressure chambers D1-D4, a multiplex arrangement 2 comprising two pressure-controlled selector valves WV1, WV2 for selective assignment of the two gear-regulating valves GV1, GV2 to a maximum of two of the four pressure chambers D1-D4, and two pilot valves VV1, VV2 constructed as magnetic valves 3, 4 for combined actuation of the two gear-regulating valves GV1 or, as the case may be, GV2 and the two selector valves WV1 or, as the case may be, WV2.

The first pilot valve VV1, which can, for example, be constructed as a 3/2-way magnetic regulating valve or as a 3/3-way magnetic regulating valve, features a connection to a control pressure supply line 5 carrying a reduction pressure $P\_Red$, a control terminal 6 of a control pressure line 7 leading to the first gear-regulating valve GV1, and a switching pressure line 8 leading to the second selector valve WV2, as well as a connection to a non-pressurized line that is not shown in more detail.

The first gear-regulating valve GV1 is constructed as a slide valve with a valve piston 9 and a valve spring 10. The control-pressure line 7 of the assigned first pilot valve VV1 is connected to a front-side control pressure chamber 11 of the first gear-regulating valve GV1 that faces away from the valve spring 10. A central pressure chamber 12 of the first gear-regulating valve GV1 is connected to the first selector valve WV1 by means of an operating-pressure line 13. By means of the control collar of the valve piston 9 adjacent to the control edges, the central pressure chamber 12, and in that way the operating pressure line 13, can be connected in a controllable manner to a pressure line 14, which branches off from a supply pressure line 15 that carries a system pressure P_Sys, and to a non-pressurized line 16, which leads to a collector line 17. In that way, a pilot pressure that is adjusted by the pilot valve VV1 in the control pressure line 7 is proportionally transformed by means of the gear-regulating valve GV1 into an operating pressure that is operant in the operating pressure line 13.

The second pilot valve VV2, which is preferably constructed in the same way as the first pilot valve VV1, features a connection to the control pressure supply line 5 that carries the reduction pressure P_Red, a terminal 26 of a control-pressure line 27 that leads to the second gear-regulating valve GV2, and a switching-pressure line 28 that leads to the first selector valve WV1, as well as a connection to a non-pressurized line that is not shown in more detail.

The second gear-regulating valve GV2 is constructed in the same way as the first gear-regulating valve GV1 as a slide valve with a valve piston 29 and a valve spring 30. The control-pressure line 27 of the assigned second pilot valve VV2 is connected to a front-side control-pressure chamber 31 of the second gear-regulating valve GV2 that faces away from valve spring 30. A central pressure chamber 32 of the second gear-regulating valve GV2 is in connection with the second selector valve WV2 by means of an operating pressure line 33. By means of the control collar of the valve piston 29 adjacent to the control edges, the central pressure chamber 32, and in that way the operating-pressure line 33, can be controllably connected to a pressure line 34 that branches off from the supply pressure line 15 and to a non-pressurized line 36 that leads to the collector line 17. In that way, a pilot pressure that is adjusted in the control pressure line 27 by means of the pilot valve VV2 is proportionally transformed by means of the gear-regulating valve GV2 into an operating pressure that is operant in the operating pressure line 33.

The first selector valve WV1 is constructed as a slide valve with a valve piston 41 and a valve spring 42. The switching pressure line 28 of the assigned second pilot valve VV2 is connected to a front-side switching pressure chamber 43 of the first selector valve WV1 that faces away from the valve spring 42. The operating pressure line 13 that comes from the first gear-regulating valve GV1 is connected to a central pressure chamber 44 of this selector valve WV1. By means of the control collar of the valve piston 41 adjacent to the control edges, this pressure chamber 44, and in that way the operating pressure line 13, can be alternately connected to a connecting line 45 that leads to the second pressure chamber D4 of the second gear-actuating cylinder Z2, or to a connecting line 46 that leads to the second pressure chamber D2 of the first gear-actuating cylinder Z1.

In that way, the operating pressure line 13 that comes from the first gear-regulating valve GV1 is alternately connected through to the second pressure chamber D2 of the first gear-actuating cylinder Z1, or to the second pressure chamber D4 of the second gear-actuating cylinder Z2, in this instance, with non-switched selector valve WV1, to the pressure chamber D4 of the second gear-actuating cylinder Z2, and with switched selector valve WV1, to the pressure chamber D2 of the first gear-actuating cylinder Z1.

The second selector valve WV2 is also constructed as a slide switch valve with a valve piston 51 and a valve spring 52. The switching pressure line 8 of the assigned first pilot valve WV1 is connected to a front-side switching pressure chamber 53 of the second selector valve WV2 that faces away from the valve spring 52. The operating pressure line 33 that comes from second gear-regulating valve GV2 is connected to a central pressure chamber 54 of this selector valve WV2. By means of the control collar of the valve piston 51 adjacent to the control edges, this pressure chamber 54, and in that way the operating pressure line 33, can be connected alternately to a connecting line 55 that leads to the first pressure chamber D3 of the second gear-actuating cylinder Z2, or to a connecting line 56 that leads to the first pressure chamber D1 of the first gear-actuating cylinder Z1.

In that way, the operating pressure line 33 that comes from the second gear-regulating valve GV2 is alternately connected through via the second selector valve WV2 to the first pressure chamber D1 of the first gear-actuating cylinder Z1, or to the first pressure chamber D3 of the second gear-actuating cylinder Z2, in this instance, with non-switched selector valve WV2 to the pressure chamber D3 of the second gear-actuating cylinder Z2, and with switched selector valve WV2, to the pressure chamber D1 of the first gear-actuating cylinder Z1.

The connecting lines 45, 46, 55, 56 that are blocked in the two shift positions of the two selector valves WV1, WV2 are then switched respectively without pressure by means of a connection to the collector line 17. The collector line 17 is connected to an oil sump, which is not shown in more detail, by means of a pre-filling valve VBV, by means of which drainage of the pressure chambers D1-D4 and the lines concerned is prevented.

In order to compensate for and dampen pressure fluctuations, the control pressure lines 7, 27 of the two gear-regulating valves GV1, GV2 are each provided with an inbuilt throttle 61, 63, and in each case with an attached pressure reservoir 62, 64.

The functional scope of this control device 1.1 with respect to the controllability of the two gear-actuating cylinders Z1, Z2 is seen in the Table in FIG. 2. It shows, in schematic form, which pressure chambers D1-D4, subject to the shifting status of the two selector valves WV1, WV2, is respectively adjustable by means of the assigned gear-regulating valves GV1, GV2. Here, in the two upper lines, an empty-circle symbol means in each case the non-switched shifting state, and a filled-circle symbol means in each case the switched shifting state of the selector valve concerned WV1, WV2. In the lower four lines, the non-adjustable state of the pressure chambers concerned D1-D4 is indicated in each case by the absence of a symbol, and the adjustable state of the pressure chambers D1-D4 in each case by a filled-circle symbol.

From this, it can be seen that with three combinations of shifting positions of the two selector valves WV1, WV2 respectively, at least one of the pressure chambers D1-D4 can be controlled by means of one of the gear-regulating valves GV1, GV2, and that in a combination of this, two pressure chambers D1, D2 can be controlled simultaneously and independently of each other by means of both gear-regulating valves GV1, GV2. This characteristic of the control device 1.1 can be utilized by means of corresponding assignment of the gears to the gear-actuating cylinders Z1, Z1, or by means of a corresponding connection of the connecting lines 45, 46, 55, 56 to the pressure chambers D1-D4, for example, in order to accelerate specific shifts.

Figure 4:
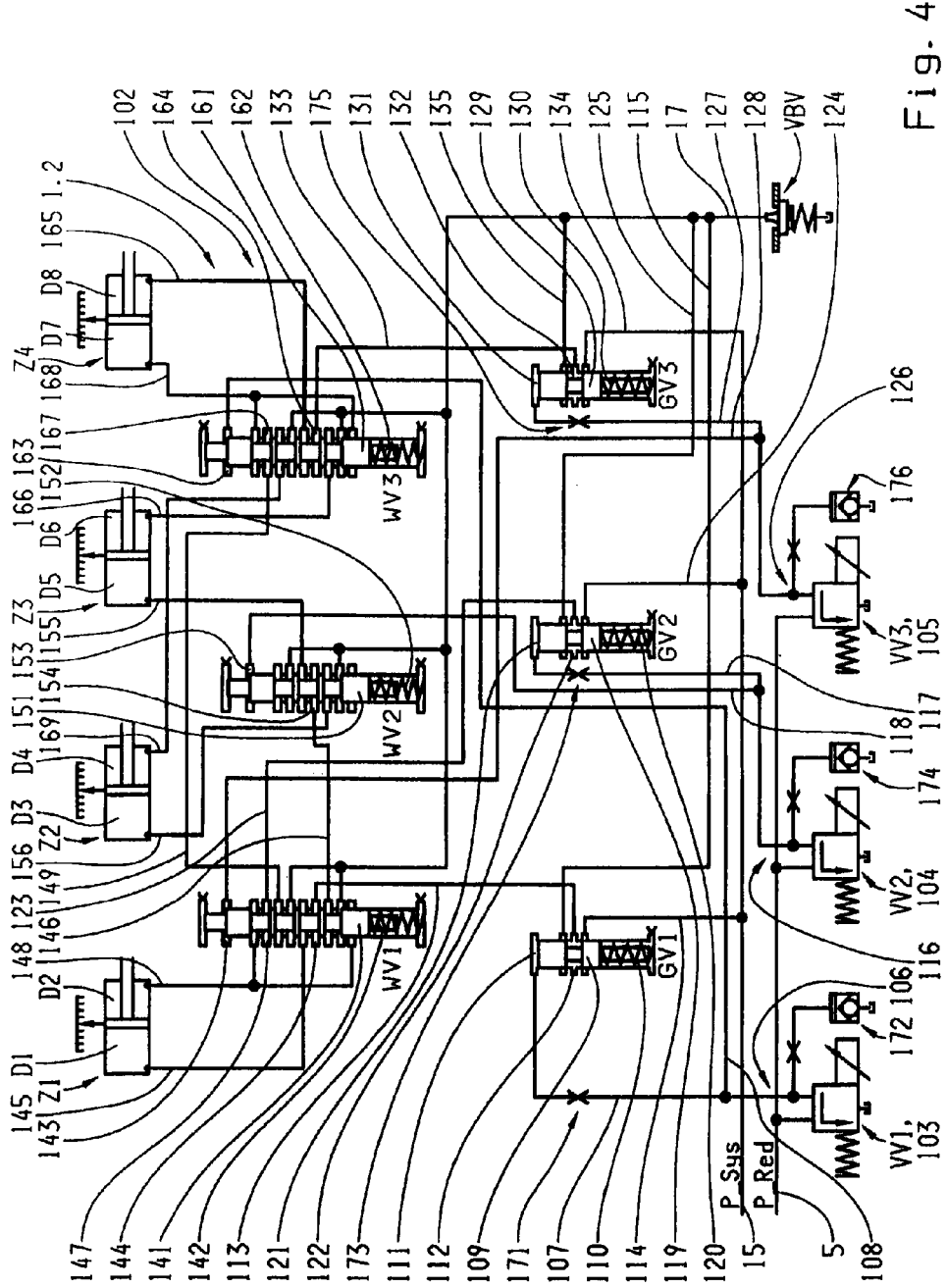

A second embodiment of three pilot valves of this kind with a combined regulating and switching function is seen in an inventive hydraulic control device 1.2 according to FIG. 4, which can be used in an automated dual-clutch transmission. This control device 1.2 comprises four dual-acting gear-actuating cylinders Z1-Z4, each with two pressure chambers D1-D8, three pressure-controlled gear-regulating valves GV1, GV2, GV3 for regulating the operating pressure in three of the pressure chambers D1-D8, a multiplex arrangement 102 of three pressure-controlled selector valves WV1, WV2, WV3 for selective assignment of the three gear-regulating valves GV1, GV2, GV3 to a maximum of three of the eight pressure chambers D1-D8, as well as three pilot valves configured as magnetic valves 103, 104, 105 for combined control of the three gear-regulating valves GV1, GV2, GV3 and the three selector valves WV1, WV2, WV3.

The first pilot valve VV1, which can, for example, be constructed as a 3/2-way magnetic regulating valve or as a 3/3-way magnetic regulating valve features a connection to an operating pressure supply line 5 that carries a reduction pressure P_Red, a control terminal 106 of a control pressure line 107 that leads to the first gear-regulating valve GV1 and a switching pressure line 108 that leads to the third selector valve WV3, and a connection to a non-pressurized line not shown in more detail.

The first gear-regulating valve GV1 is configured as a slide valve with a valve piston 109 and a valve spring 100. The control pressure line 107 of the assigned first pilot valve VV1 is connected to a front-side control pressure chamber 111 of the first gear-regulating valve GV1 that faces away from the valve spring 110. A central pressure chamber 112 of the first gear-regulating valve GV1 is in connection with the first selector valve WV1 by means of an operating pressure line 113. By means of the control collar of the valve piston 109 adjacent to the control edges, the central pressure chamber 112, and in that way the operating pressure line 113, can be connected in a controllable manner to a pressure line 114 that branches off from a supply pressure line 15 that carries a system pressure P_Sys, and to non-pressurized line 15, that leads to a collector line 17. In that way, a pilot pressure that is adjusted by the pilot valve VV1 in the control pressure line 107 is proportionally transformed by means of the gear-regulating valve GV1 into an operating pressure that is operant in the operating pressure line 113.

The second pilot valve VV2, which is preferably constructed in the same way as the first pilot valve VV1, features a connection to the control pressure supply line 5 that carries the reduction pressure P_Red, a control terminal 116 of a control pressure line 117 leading to the second gear-regulating valve GV2 and to a switching pressure line 118 leading to the second selector valve WV2, as well as a connection to a non-pressurized line that is not shown in more detail.

The second gear-regulating valve GV2 is constructed in the same way as the first gear-regulating valve GV1 as a slide valve with a valve piston 119 and a valve spring 120. The control pressure line 117 of the assigned second pilot valve VV2 is connected to a front-side control pressure chamber 121 of the second gear-regulating valve GV2 that faces away from the valve spring 120. A central pressure chamber 122 of the second gear-regulating valve GV2 is in connection with the first selector valve WV1 by means of an operating pressure line 123. By means of the control collar of the valve piston 119 adjacent to the control edges, the central pressure chamber 122, and in that way the operating pressure line 123, can be controllably connected to a pressure line 124 that branches off from the supply pressure line 15 and to a non-pressurized line 125 that leads to the collector line 17. In that way, a pilot pressure that is adjusted by the pilot valve VV2 in the control pressure line 117 is proportionally transformed by means of the gear-regulating valve GV2 into an operating pressure that is operant in the operating pressure line 123.

The third pilot valve VV2, which is preferably constructed in the same way as the two other pilot valves VV1, VV2, features a connection to the control pressure supply line 5 that carries the reduction pressure P_Red, a control terminal 126 of a control pressure line 127 leading to the third gear-regulating valve GV3 and to a switching pressure line 128 leading to the first selector valve WV1, as well as a connection to a non-pressurized line that is not shown in more detail.

The third gear-regulating valve GV3 is constructed in the same way as the two other gear-regulating valves GV1, GV2, as a slide valve with a valve piston 129 and a valve spring 130. The control pressure line 127 of the assigned third pilot valve VV3 is connected to a front-side control pressure chamber 131 of the third gear-regulating valve GV3 that faces away from the valve spring 130. A central pressure chamber 132 of the third gear-regulating valve GV3 is in connection with the third selector valve WV3 by means of an operating pressure line 133. By means of the control collar of the valve piston 129 adjacent to the control edges, the central pressure chamber 132, and in that way the operating pressure line 133, can be controllably connected to a pressure line 134 that branches off from the supply pressure line 15, and to a non-pressurized line 135 that leads to the collector line 17. In that way, a pilot pressure that is adjusted by the pilot valve VV3 in the control pressure line 127 is proportionally transformed by means of the gear-regulating valve GV3 into an operating pressure that is operant in the operating pressure line 133.

The first selector valve WV1 is configured as a slide switch valve with a valve piston 141 and a valve spring 142. The control pressure line 128 of the assigned third pilot valve VV3 is connected to a front-side control pressure chamber 143 of the first selector valve WV1 that faces away from the valve spring 142. The operating pressure line 113 coming from the first gear-regulating valve GV1 is connected to a first central pressure chamber 144 of this selector valve 1. By means of the control collar of the valve piston 141 adjacent to the control edges, this pressure chamber 144, and in that way the operating pressure line 113, can be alternately connected in a controllable manner to a connecting line 145 leading to the first pressure chamber D1 of the first gear-actuating cylinder Z1, or to an interconnecting line 146 leading to the second selector valve WV2.

The operating pressure line 123 coming from the second gear-regulating valve GV2 is connected to a second central pressure chamber 147 of the first selector valve WV1. By means of the control collar of the valve piston 141 adjacent to the control edges, this pressure chamber 147, and in that way the operating pressure line 123, can be alternately connected to a connecting line 148 leading to the second pressure chamber D2 of the first gear-actuating cylinder Z1, or to an interconnecting line 149 leading to the third selector valve WV3.

In this way, the two operating pressure lines 113 or, as the case may be, 123 coming from the first gear-regulating valve GV1 and the second gear-regulating valve GV2, can be alternately connected through to the two pressure chambers D1, D2 of the first gear-actuating cylinder Z1 or on to the two other selector valves WV2, WV3, in this instance, with non-switched selector valve WV1, to the pressure chambers D1, D2 of the first gear-actuating cylinder Z1, and with switched selector valve WV1, on to the other selector valves WV2, WV3.

The second selector valve WV2 is also constructed as a slide switch valve with a valve piston 151 and a valve spring 152. The switching pressure line 118 of the assigned second pilot valve VV2 is connected to a front-side control pressure chamber 153 of the second selector valve WV2 that faces away from the valve spring 152. The interconnecting line 146 coming from the first selector valve WV1 is connected to a central pressure chamber 154 of this selector valve WV2. By means of the control collar of the valve piston 151 adjacent to the control edges, this pressure chamber 154, and in that way the interconnecting line 146, can be connected alternately to a connecting line 155 leading to the first pressure chamber D5 of the third gear-actuating cylinder Z3, or to a connecting line 156 leading to the first pressure chamber D3 of the second gear-actuating cylinder Z2.

In this way, the interconnecting line 146 that comes from the first selector valve GV1, and which, when the first selector valve WV1 is not switched, carries the operating pressure adjusted by the first gear-regulating valve GV1, is switched through alternately to the two pressure chambers D3, D5 of the second gear-actuating cylinder Z2, and the third gear-actuating cylinder Z3, in this instance, with non-switched selector valve WV2, to the pressure chamber D5 of the third gear-actuating cylinder Z3, and with switched selector valve WV2, to the pressure chamber D3 of the second gear-actuating cylinder Z2.

The third selector valve WV3 is designed as largely identical in construction to the first selector valve WV1 and is configured as a slide switch valve with a valve piston 161 and a valve spring 162. The switching pressure line 108 of the assigned first pilot valve VV1 is connected to a front-side switching pressure chamber 163 of the third selector valve WV3 that faces away from the valve spring. The operating pressure line 133 coming from the third gear-regulating valve GV3 is connected to a first central pressure chamber 164 of this selector valve WV3. By means of the control collar of the valve piston 161 adjacent to the control edges, this pressure chamber 164, and in that way the operating pressure line 133, can be connected alternately to a connecting line 165 leading to the second pressure chamber D8 of the fourth gear-actuating cylinder Z4, or to a connecting line 166 leading to the second pressure chamber D6 of the third gear-actuating cylinder Z3.

The interconnecting line 149 coming from the first selector valve WV1 is connected to a second central pressure chamber 167 of the third selector valve WV3. By means of the control collar of the valve piston 161 adjacent to the control edges, this pressure chamber 167, and in that way the interconnecting line 149 can be alternately connected to connecting line 168 leading to the first pressure chamber D7 of the fourth gear-actuating cylinder Z4, or to a connecting line 169 leading to the second pressure chamber D4 of the second gear-actuating cylinder Z2.

In that way, by means of the third selector valve, the operating pressure line 133 coming from the third gear-regulating valve GV3 is switched through alternately to the pressure chambers D6 or, as the case may be, D8 of the third gear-actuating cylinder Z3 and the fourth gear-actuating cylinder, and the interconnecting line 149 coming from the first selector valve WV1, which, when the first selector valve WV1 is shifted, carries the operating pressure adjusted by the second gear-regulating valve GV2, is switched through alternately to the pressure chambers D4 or, as the case may be, D7 of the second gear-actuating cylinder Z2 and the fourth gear-actuating cylinder Z4, in the present instance, with the selector valve WV3 not switched, to the pressure chambers D7 or, as the case may be, D8 of the fourth gear-actuating cylinder Z4, and with switched selector valve WV3, to pressure chambers D4 or, as the case may be, D6 of the second gear-actuating cylinder Z2 and the third gear-actuating cylinder Z3.

The connecting lines 145, 148, 155, 156, 165, 166, 168, 169, and the interconnecting lines 146, 149 that are blocked respectively in the two shift positions of the of the three selector valves WV1, WV2, WV3, are then switched without pressure in each case via a connection with the collector line 17. The collector line 17 is connected to an oil sump, which is not shown in more detail, by means of a pre-filling valve VBV, by means of which drainage of the pressure chambers D1-D8 and the lines concerned is prevented.

In order to compensate for and dampen pressure fluctuations, the control pressure lines 107, 117, 127 of the three gear-regulating valves GV1, GV2, GV3 are each provided with an inbuilt throttle 171, 173, 175, and in each case with an attached pressure reservoir 172, 174, 176.

Figure 5:
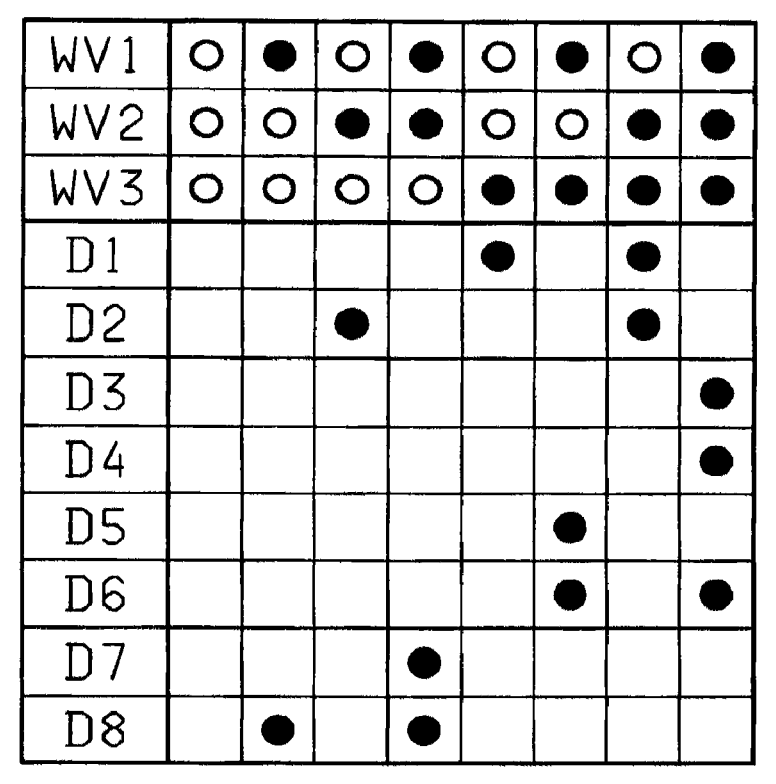

The functional scope of this control device 1.2 with respect to the controllability of the four gear-actuating cylinders Z1-Z4 is seen in the Table in FIG. 5. It shows, in schematic form, which pressure chambers D1-D8, subject to the shifting status of the three selector valves WV1, WV2, WV3, is respectively adjustable by means of the assigned gear-regulating valves GV1, GV2, GV3. Here, in the three upper lines, an empty-circle symbol means in each case the non-switched shifting state, and a filled-circle symbol means in each case the switched shifting state of the selector valve concerned WV1, WV2, WV3. In the lower eight lines, the non-adjustable state of the pressure chambers concerned D1-D9 is indicated in each case by the absence of a symbol, and the adjustable state of the pressure chambers D1-D8 indicated in each case by a filled-circle symbol.

From this, it can be seen that in the seven combinations of shifting positions of the three selector valves WV1, WV2, WV3 respectively, at least one of the pressure chambers D1-D8 can be controlled by means of at least one of the gear-regulating valves GV1, GV2, GV3; that in four combinations of shifting positions, in each case at least two of the pressure chambers D1-D8 can be controlled simultaneously and independently of each other by means of two of the gear-regulating valves GV1, GV2, GV; and that in a combination of them, the three pressure chambers D3, D4, D6 can be controlled simultaneously and independently of each other by means of all three gear-regulating valves GV1, GV2, GV3.

This characteristic of the control device 1.2 can be exploited, by means of a corresponding assignment of the gears to the gear-actuating cylinders Z1-Z4, or by means of a corresponding connection of the connecting lines 145, 148, 155, 156, 165, 166, 168, 169 to the pressure chambers D1-D8, for example for accelerating specific shifts. For this purpose, it is advantageous if the two pressure chambers D1, D2; D3, D4; D5, D6 or D7, D8, whose operating pressures in corresponding shift positions of the selector valve WV1, WV2, WV3 are in each case simultaneously controllable, as shown in FIG. 4, are assigned in each case to a common actuating rod of the transmission.

It is also advantageous in this case if the pressure chambers D3, D4, D6, whose operating pressures are simultaneously controllable in a corresponding shift position of the selector valves WV1, WV2, WV3, are assigned to the gears that are often shifted in rapid succession during drive operations, especially the first gear G1, the second gear G2, and the reverse gear R, because then high startup acceleration and rapid change in diving direction are possible when rocking the vehicle or, as the case may be, during parking maneuvering.

Reference Signs
1.1 Hydraulic control device
1.2 Hydraulic control device
1.3 Hydraulic control device
1 Multiplex arrangement
2 Magnetic regulating valve
3 Magnetic regulating valve 4 Control pressure supply line
5 Control terminal
6 Control pressure line
7 Switching pressure line
8 Valve piston
9 Valve spring
10 Control pressure chamber
11 Pressure chamber
12 Operating pressure line
13 Pressure line
14 Supply pressure line
15 Non-pressurized line
16 Collector line
26 Control terminal
27 Control pressure line
28 Switching pressure line
29 Valve piston
30 Valve spring
31 Control pressure chamber
32 Pressure chamber
33 Operating pressure line
34 Pressure line
36 Non-pressurized line
41 Valve piston
42 Valve spring
43 Switching pressure chamber
44 Pressure chamber
45 Connecting line
46 Connecting line
51 Valve piston
52 Valve spring
53 Switching pressure chamber
54 Pressure chamber
55 Connecting line
56 Connecting line
61 Throttle
62 Pressure reservoir
63 Throttle
64 Pressure reservoir
102 Multiplex arrangement
103 Magnetic regulator valve
104 Magnetic regulator valve
105 Magnetic regulator valve
106 Control terminal
107 Control pressure line
108 Control pressure line
109 Valve piston
110 Valve spring
111 Control pressure chamber
112 Pressure chamber
113 Operating pressure line
114 Pressure line
115 Non-pressurized line
116 Control terminal
117 Control pressure line
118 Switching pressure line
119 Valve piston
120 Valve spring
121 Control pressure chamber
122 Pressure chamber
123 Operating pressure line
124 Pressure line
125 Non-pressurized line
126 Control terminal
127 Control pressure line
128 Switching pressure line
129 Valve piston
130 Valve spring
131 Control pressure chamber
132 Pressure chamber
133 Operating pressure line
134 Pressure line
135 Non-pressurized line
141 Valve piston
142 Valve spring
143 Switching pressure chamber
144 Pressure chamber
145 Connecting line
146 Interconnecting line
147 Pressure chamber
148 Connecting line
149 Interconnecting line
151 Valve piston
152 Valve spring
153 Switching pressure chamber
154 Pressure chamber
155 Connecting line
156 Connecting line
161 Valve piston
162 Valve spring
163 Switching pressure chamber
164 Pressure chamber
165 Connecting line
166 Connecting line
167 Pressure chamber
168 Connecting line
169 Connecting line
171 Throttle
172 Pressure reservoir
173 Throttle
174 Pressure reservoir
175 Throttle
176 Pressure reservoir
202 Multiplex arrangement
203 Magnetic regulator valve
204 magnetic regulator valve
205 Magnetic control valve
206 Magnetic control valve
208 Control terminal
209 Control pressure line
210 Valve piston
211 Control pressure chamber
212 Pressure chamber
213 Operating pressure line
214 Pressure line
216 Non-pressurized line
218 Control terminal
219 Control pressure line
220 Valve piston
221 Control pressure chamber
222 Pressure chamber
223 Operating pressure line
224 Pressure line
226 Non-pressurized line
228 Control terminal
229 Switching pressure line
230 Valve piston
231 Valve spring
232 Switching pressure chamber
233 Pressure chamber
234 Interconnecting line
235 Interconnecting line
236 Pressure chamber
237 Interconnecting line 238 Interconnecting line
239 Control terminal
240 Switching pressure line
241 Valve piston
242 Valve spring
243 Switching pressure chamber
244 Pressure chamber
245 Connecting line
246 Connecting line
247 Pressure chamber
249 Connecting line
250 Connecting line
251 Valve piston
252 Valve spring
253 Switching pressure chamber
254 Pressure chamber
255 Connecting line
256 Connecting line
257 Pressure chamber
259 Connecting line
260 Connecting line
261 Throttle
262 Pressure reservoir
263 Throttle
264 Pressure reservoir
D1-D8 Pressure chamber
G1, G2 (Forward) gear
GV1-GV3 Gear-regulating valve
P_A Operating pressure
P_Red Reduction pressure
P_R0 Beginning of regulating range
P_S Switching pressure
P_St Control pressure
P_Sys System pressure
$\Delta P\_B1, \Delta P\_B2$ Control pressure range
$\Delta P\_R$ Regulating range
R Reverse gear
RKL Control characteristic
SKL Shifting characteristic
SZ Switching status
TWV Partial transmission selector valve
VBV Pre-filling valve
VV1-VV3 Pilot valve
VV3', VV4' Pilot valve
WV1-WV3 Selector valve
ZWV1, ZWV2 Cylinder selector valve
Z1-Z4 Gear-actuating cylinder

The invention claimed is:

1. A hydraulic control device of an automated multi-step transmission, the control device comprising:
   a plurality of gear-actuating cylinders (Z1-Z4) for engaging and disengaging gears of the multi-step transmission;
   at least two pressure-controlled gear-regulating valves (GV1-GV3) for controlling an operating pressure of one pressure chamber (D1-D8) of the gear-actuating cylinders (Z1-Z4);
   a multiplex arrangement (2, 102) of a plurality of singly switchable pressure-controlled selector valves (WV1-WV3) for assigning the gear-regulating valves (GV1-GV3) to, in each case, the one pressure chamber (D1-D8) of the gear-actuating cylinders (Z1-Z4);
   at least one common pilot valve (VV1-VV3) for actuating one of the gear-regulating valves (GV1-GV2) and at least one of the selector valves (WV1-WV3);
      the pilot valve (VV1-VV3) having a first control pressure range ($\Delta P\_B1$) containing a switching pressure (P_S) of the at least one selector valve (WV1-WV3) and a second control pressure range ($\Delta P\_B2$) containing a regulating range ($\Delta P\_R$) of the gear-regulating valve (GV1-GV3);
   the gear-regulating valve (GV1-GV3) and the at least one selector valve (WV1-WV3), which are controllable by the common pilot valve (VV1-VV3), being assigned to one of different actuating rods and a different partial transmission; and
   the multi-step transmission or the partial transmission of the multi-step transmission having two actuating rods, a switching arrangement with two gear-regulating valves (GV1, GV2), two selector valves (WV1, WV2), and two pilot valves (VV1, VV2), in each case two pressure chambers (D1-D4) being alternately connectable, via respectively one of the selector valves (WV1, WV2) with the operating pressure line (13, 33) of an assigned gear-regulating valve (GV1, GV2) or a non-pressurized line, such that a control pressure chamber (11, 31) of the respective gear-regulating valve (GV1, GV2), by a control pressure line (7, 27) and a switching pressure chamber (43, 53) of the selector valve (WV1, WV2) assigned respectively to the other gear-regulating valve (GV1, GV2) via a switching pressure line (8, 28), being connected respectively to a control terminal (6, 26) of a common pilot valve (VV1, VV2).

2. The control device according to claim 1, wherein the first control pressure range ($\Delta P\_B1$) is below the second control pressure range ($\Delta P\_B2$) such that the switching pressure (P_S) of the at least one selector valve (WV1-WV3) is approximately in a middle of the first control pressure range ($\Delta P\_B1$), and the regulating range ($\Delta P\_R$) of the gear-regulating valve (GV1, GV3) is substantially identical to the second control pressure range ($\Delta P\_B2$).

3. The control device according to claim 2, wherein a beginning of the regulating range (P_RO) of the gear-regulating valve (GV1-GV3) is displaced and adjusted by a pre-tensioned valve spring (10, 30, 110, 120, 130) to a higher control pressure (P_St) of the pilot valve (VV1-VV3).

4. The control device according to claim 1, wherein the pilot valve (VV1-VV3) is a magnetic regulating valve (3, 4, 103, 104, 105) and is connected to a control pressure supply line (5), that carries an input-side control pressure (P_Red), a control terminal (6, 26, 106, 116, 126) of a further control pressure line (7, 27, 107, 117, 127), that connects to an assigned one of the gear-regulating valve (GV1-GV3), a switching pressure line (8, 28, 108, 118, 128), that connects to an assigned one of the selector valves (WV1-WV3), and a connection to a non-pressurized line.

5. The control device according to claim 1, wherein the two pressure chambers (D3, D4) that are connected to the gear-regulating valves (GV1, GV2) when the selector valves (WV1, WV2) are not switched, and the two pressure chambers (D1, D2) that are connected to the gear-regulating valves (GV1, GV2) when the selector valves (WV1, WV2) are switched, are respectively assigned to a common actuating rod.

6. The control device according to claim 1, wherein the two pressure chambers (D3, D4) that are connected to the gear-regulating valves (GV1, GV2) when the selector valves (WV1, WV2) are not switched, and the two pressure chambers (D1, D2) that are connected to the gear-regulating valves (GV1, GV2) when the selector valves (WV1, WV2) are switched, are assigned to different actuating rods.

7. A hydraulic control device of an automated multi-step transmission, the control device comprising:

a plurality of gear-actuating cylinders (Z1-Z4) for engaging and disengaging gears of the multi-step transmission;

at least two pressure-controlled gear-regulating valves (GV1-GV3) for controlling an operating pressure of one pressure chamber (D1-D8) of the gear-actuating cylinders (Z1-Z4);

a multiplex arrangement (2, 102) of a plurality of singly switchable pressure-controlled selector valves (WV1-WV3) for assigning the gear-regulating valves (GV1-GV3) to one pressure chamber (D1-D8) of the gear-actuating cylinders (Z1-Z4);

at least one common pilot valve (VV1-VV3) for actuating one of the gear-regulating valves (GV1-GV2) and at least one of the selector valves (WV1-WV3);

the pilot valve (VV1-VV3) having a first control pressure range ($\Delta P\_B1$) containing a switching pressure (P_S) of the at least one selector valve (WV1-WV3) and a second control pressure range ($\Delta P\_B2$) containing a regulating range ($\Delta P\_R$) of the gear-regulating valve (GV1-GV3);

the gear-regulating valve (GV1-GV3) and the at least one selector valve (WV1-WV3), which are controllable by the common pilot valve (VV1-VV3), being assigned to one of different actuating rods and a different partial transmission; and the multi-step transmission has four actuating rods, a shifting arrangement with three gear-regulating valves (GV1-GV3), three selector valves (WV1-WV3), and three pilot valves (VV1-VV3), by which, via a first selector valve (WV1), an operating pressure line (113) of a first gear-regulating valve (GV1) and an operating pressure line (123) of a second gear-regulating valve (GV2) are alternately connected to an assigned pressure chamber (D1, D2) or an interconnecting line (146; 149) that leads, in each case, to another selector valve (WV2, WV3), by which, via a second selector valve (WV2), the interconnecting line from the first selector valve (WV1) is alternately connectable to two different pressure chambers (D3, D5) and, via a third selector valve (WV3), an operating pressure line (133) of a third gear-regulating valve (GV3) and the interconnecting line (149) of the first selector valve (WV1), are alternately connectable to two different pressure chambers (D6, D8; D4, D7), one control pressure chamber (111) of the first gear-regulating valve (GV1) and one switching pressure chamber (163) of the third selector valve (WV3) are connected to a control terminal (106) of a common first pilot valve (VV1), one control pressure chamber (121) of the second gear-regulating valve (GV2) and one switching pressure chamber (153) of the second selector valve (WV2) is connected to a control terminal (116) of a common second pilot valve (VV1), and one control pressure chamber (131) of the third gear-regulating valve (GV3) and one switching pressure chamber (143) of the first selector valve (WV1) is connected to a control terminal (106) of a common third pilot valve (VV3).

8. The control device according to claim 7, wherein the two pressure chambers (D1, D2; D3, D4; D5, D6; D7, D8) are each assigned to a common actuating rod and have operating pressures, in corresponding shift positions of the selector valves (WV1-WV3), that are simultaneously regulated.

9. The control device according to claim 7, wherein three pressure chambers (D3, D4, D6) having operating pressures, in a corresponding shift position of the selector valves (WV1-WV3), that are regulated simultaneously and assigned to a first gear (G1), a second gear (G2), and a reverse gear (R).

* * * * *